(12) United States Patent
Li (10) Patent No.: US 6,961,525 B2
(45) Date of Patent: Nov. 1, 2005

(54) METHOD FOR CHANNEL BALANCE (75) Inventor: Jinghui Li, San Jose, CA (US)

(73) Assignee: Sycamore Networks, Inc., Chelmsford, MA (US)

( * ) Notice: Subject to any disclaimer, the term of this patent is extended or adjusted under 35 U.S.C. 154(b) by 680 days.

(21) Appl. No.: 10/004,088

(22) Filed: Oct. 23, 2001

(65) Prior Publication Data
US 2002/0101637 A1 Aug. 1, 2002

Related U.S. Application Data (60) Provisional application No. 60/249,675, filed on Nov. 17, 2000.

(51) Int. Cl.$^7$ .................. H04B 10/04; H04B 10/12; H04J 14/02
(52) U.S. Cl. ........................... 398/197; 398/94
(58) Field of Search ............... 398/197, 94, 26–27

(56) References Cited

U.S. PATENT DOCUMENTS

| | | |
|---|---|---|
| 5,225,922 A | 7/1993 | Chraplyvy et al. ......... 359/124 |
| 5,923,450 A | 7/1999 | Dugan et al. ............... 359/127 |
| 5,943,151 A * | 8/1999 | Grasso et al. .............. 398/147 |
| 6,219,162 B1 * | 4/2001 | Barnard et al. ............... 398/9 |
| 6,532,087 B1 * | 3/2003 | Ransford et al. ............. 398/27 |
| 6,570,683 B1 * | 5/2003 | Lu .............................. 398/42 |
| 6,804,464 B2 * | 10/2004 | Yang ........................... 398/94 |
| 6,816,681 B2 * | 11/2004 | Li et al. ....................... 398/27 |
| 2003/0223747 A1 * | 12/2003 | Olier et al. ................... 398/43 |

* cited by examiner

Primary Examiner—M. R. Sedighian
Assistant Examiner—Shi K. Li
(74) Attorney, Agent, or Firm—Lahive & Cockfield, LLP (57) ABSTRACT A method of channel balance for a channel balance section in an WDM optical network with a starting node, an ending node and a plurality of intermediate OADNs (Optical Add Drop Node) first determines express wavelengths and non-express wavelengths starting from the starting node, then calculates TX (transmitter) power change which will bring the express channel performance to a target value and sets TX power using obtained TX power value. The method then moves to non-express channels by calculating TX power change for each non-express channel and sets TX power using obtained TX power value. Lastly, for each intermediate OADN, the method calculates TX power change for each added channel in each OADN and sets TX power using obtained TX power value.

16 Claims, 7 Drawing Sheets

METHOD FOR CHANNEL BALANCE

RELATED APPLICATION

This application claims priority under 35 U.S.C. §119(e) to provisional patent application Ser. No. 60/249,675, filed Nov. 17, 2000, the disclosure of which is hereby incorporated herein by reference.

FIELD OF THE INVENTION

The present invention relates generally to optical communication systems and more particularly to techniques for channel performance balance for wavelength division multiplexing (WDM) networks.

BACKGROUND OF THE INVENTION

Optical communication systems provide data exchanges between users by sending optical pulses through optical fibers. Data streams in the electrical domain are modulated and encoded into optical pulses that are received and decoded back into an electrical data stream for a recipient client or user. The optical pulses travel through optical fibers that can carry one or more channels, such as in wavelength division multiplexed networks. Wavelength division multiplexing (WDM) refers to systems that transmit a plurality of channels in a single fiber. Each of the channels corresponds to a predetermined wavelength.

In dense wavelength division multiplexing (DWDM) networks, optical signals having a relatively large number of different wavelengths are multiplexed into a signal fiber. Each wavelength corresponds to a particular channel, each of which has different performance characteristics, such as power, optical signal-to-noise ratio (OSNR), and bit error rate (BER/Q). Performance inconsistencies from channel to channel can result from a variety of factors including non-uniform erbium doped fiber amplifier (EDFA) gain/noise and dispersion tilt over the range of wavelengths. The bandwidth of a fiber can be limited by channel power variations due to diverging attenuation characteristics of the channel wavelengths.

In optical communication systems, optical power is an important parameter in determining the overall system performance. Typically, the system monitors total optical power and per channel power. The total power can be detected by photodetectors in a modular amplifier card (MAC) for controlling fiber amplifiers, such as EDFAs. The per channel power can be measured by channel monitoring cards (CMCs) for balancing and optimizing channel performance. Per channel power adjustments are made to achieve flat gains and/or equal optical signal to noise ratios (OSNR) or Q measurements. The channel power adjustments can be used to tune the transmitters to maintain an optical OSNR for the channels over the bandwidth.

Compensating for channel performance disparities is performed in an attempt to equalize channel performance in a DWDM system. The optical power of each DWDM wavelength launched at the transmitter can be selectively varied and the optimum system performance can be obtained. This is referred to as WDM Power Emphasis or power balancing. Channel balancing is conventionally performed for express wavelengths in relation to optical network source and destination points. The wavelengths added/dropped at an OADN (Optical Add Drop Node) increase the difficulty of channel balance partially due to the difficulty associated with measuring their performance. Also, as network complexity increases, channel balancing becomes increasingly difficult. For example, optical networks are evolving from point-to-point and/or ring configurations to mesh configurations, which render it more challenging to optimize the overall network performance. In addition, channel balancing on a source and destination basis limits the ability of the system to adjust channel power locally in response to isolated conditions or network modifications.

It is therefore desirable to provide in optical networks, a method of channel balancing for both express and add/drop wavelengths in a channel balance section, which may be a whole optical system from source to destination or a subsystem.

SUMMARY OF THE INVENTION

A method of channel balancing for a channel balance section in a WDM optical network with a starting node, an ending node and a plurality of intermediate OADNs (Optical Add Drop Node) first determines express wavelengths and non-express wavelengths starting from the starting node, then calculates transmitter (TX) power change, which brings the express channel performance to a target value and sets TX power using obtained TX power value. The method then moves to non-express channels by calculating TX power change for each non-express channel and sets TX power using obtained TX power values. Lastly, for each intermediate OADN, the method calculates TX power change for each added channel in each OADN, and sets TX power using obtained TX power values.

BRIEF DESCRIPTION OF THE DRAWINGS

The invention will be more fully understood from the following detailed description taken in conjunction with the accompanying drawings, in which.

DETAILED DESCRIPTION

Figure 1A:
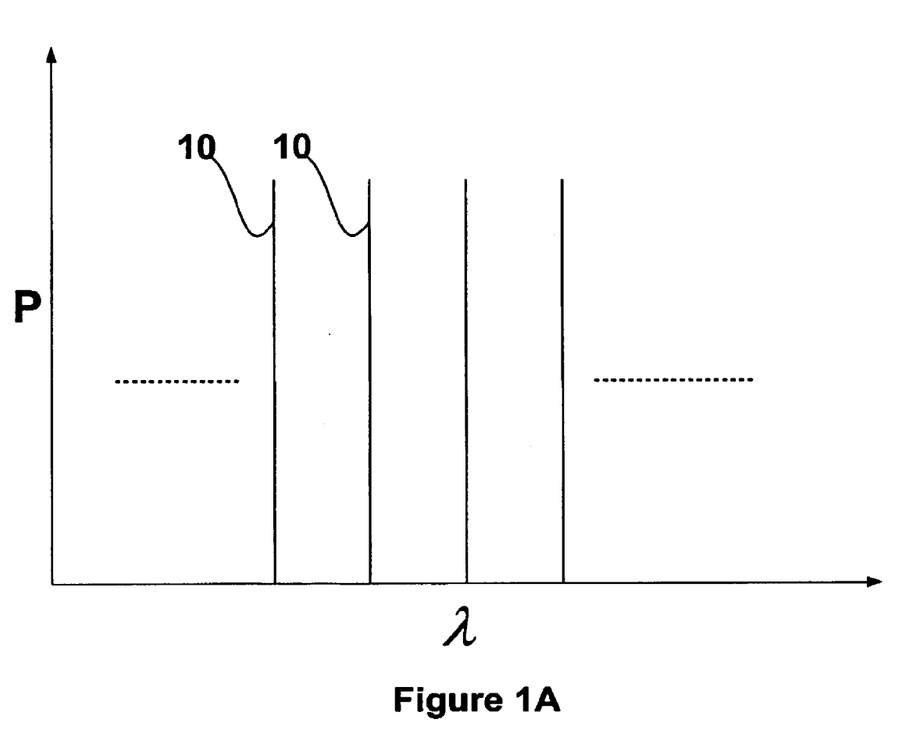
FIG. 1A is a graphical illustration of transmitted channel power for a plurality of wavelengths in an ideal wavelength division multiplexing system.
Figure 1B:
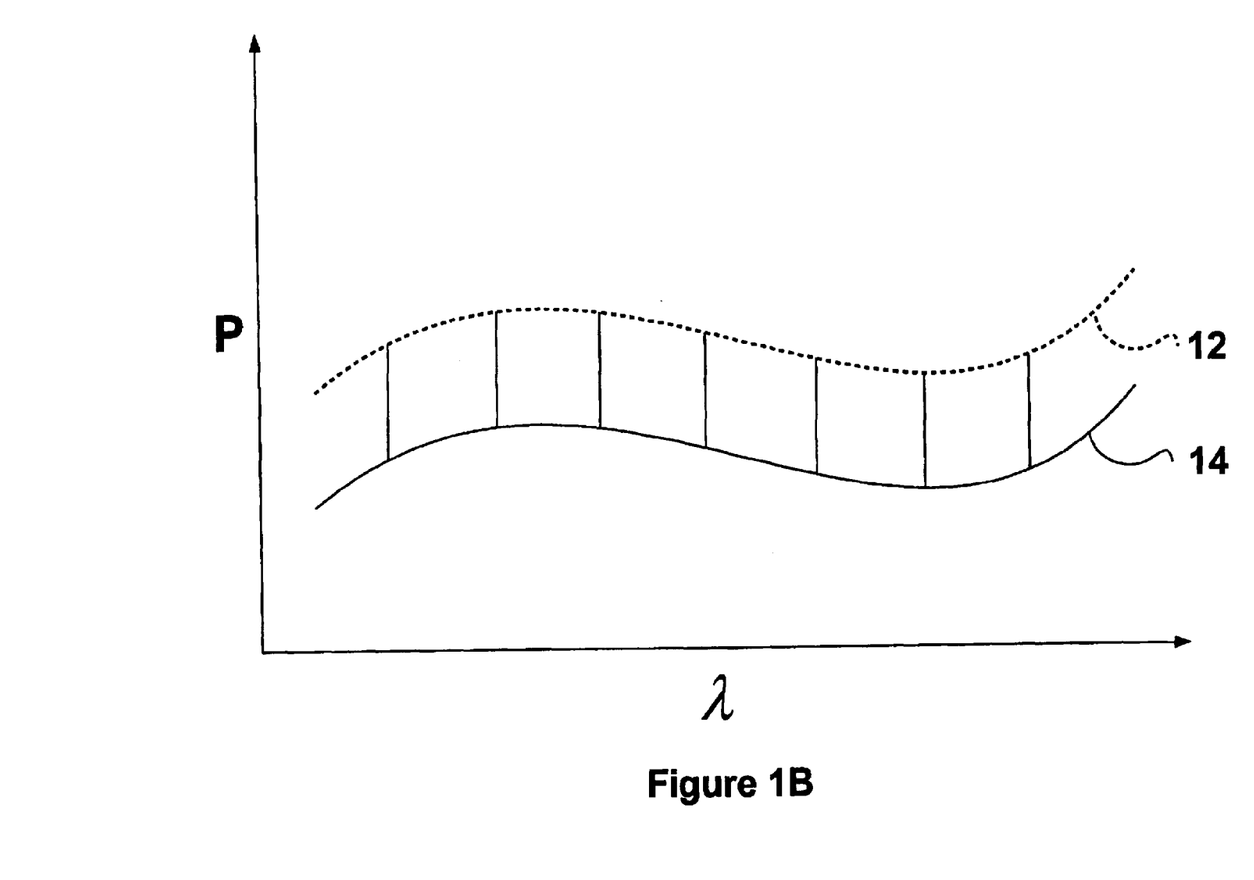
FIG. 1B is a graphical illustration of received channel power for a plurality of wavelengths in an optical communication system, according to one aspect of the present invention.

As shown in FIG. 1A, in an ideal wavelength division multiplexed (WDM) system, the transmitted signal power at the transmitter node over channel wavelengths 10 is relatively constant. However, the optical signal to noise ratios (OSNR) and power of the received signals at a receiver node for the channels varies due to the non-uniform erbium doped fiber amplifier (EDFA) gain/noise profile and other component differences in the system. As shown in FIG. 1B, an OSNR envelope 12 for the channel wavelengths 10 at the receive end is relatively constant. That is, the transmitted signal power is adjusted on a per channel basis to achieve predefined system performance, such as an equal OSNR or Q at the receiver node over a varying noise floor 14. Although the channel powers are not the same at the receivers even after the OSNR or Q balance, there is not any impact on the overall system performance, as long as the power levels fall into nominal operating ranges for the receivers.

Channel balance sections can be identified by determining starting and ending nodes with or without intermediate optical add/drop nodes (OADNs) in-between, for which power adjustments can be made for each DWDM channel. Within each identified wave balance section, channel power adjustments can be made in response to network capacity upgrades and downgrades and/or configuration changes. Changes in one section can be made without the need for changes in other channel balance sections.

Figure 2:
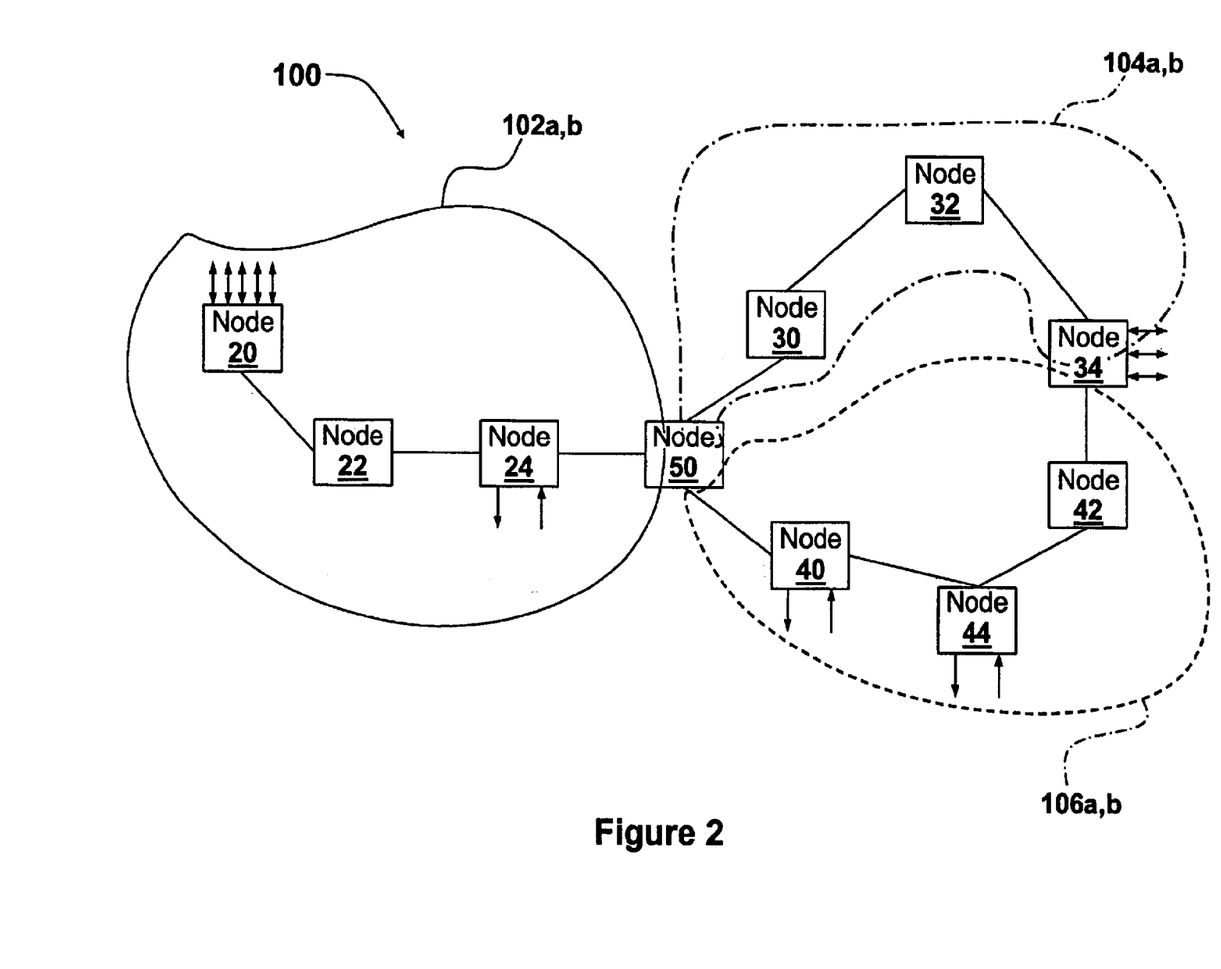
FIG. 2 is a schematic illustration of an exemplary WDM network having a plurality of channel balance sections, according to one aspect of the present invention.

FIG. 2 shows an optical network system 100 having a linear plus ring topology with six channel balance sections 102a, 102b, 104a, 104b, 106a, and 106b. It is understood that the six channel balance sections 102a, 102b, 104a, 104b, 106a, and 106b can include pairs, e.g., 102a and 102b, formed from the same group of nodes, with each section in the pair providing data traffic in an opposite direction. Channel balance section 102a includes a first node 20, a second node 22, a third node 24, and a fourth node 50. Channel balance section 102b includes the same nodes (first node 20, second node 22, third node 24, and fourth node 50) but light travels in the opposite direction relative to channel balance section 102a. The third node 24 is an intermediate OADN. Channel balance section 104a includes fourth node 50, a fifth node 30, a sixth node 32, and a seventh node 34. Channel balance section 104b includes the same nodes (fourth node 50, fifth node 30, sixth node 32, and seventh node 34) but light travels in the opposite direction relative to channel balance section 104a. Channel balance sections 104a and 104b have no intermediate OADNs. Channel balance section 106a includes fourth node 50, eighth node 40, ninth node 44, tenth node 42, and eleventh node 34. The eighth node 40 and the ninth node 44 are both intermediate OADNs. Channel balance section 106b includes the same nodes (fourth node 50, eighth node 40, ninth node 44, tenth node 42, and eleventh node 34) but light travels in the opposite direction relative to channel balance section 106a.

It will be understood by those of ordinary skill in the art that the teachings of the present invention are applicable to a wide range of optical network topologies that can include various node types. Exemplary node types include optical termination node (OTN), optical termination and regeneration node (OTRN), electrical regeneration node (ERN), optical line amplifier node (OLAN), optical add/drop node (OADN), optical equalization node (OEQN), electrical junction node (EJN), optical electrical junction node (OEJN), and optical junction node (OJN). The above listed node types are known to one of ordinary skill in the art. It is understood that the above list of nodes is not intended to be a comprehensive list of node types, but rather, to facilitate an understanding of the invention.

To optimize system performance via channel balance, measurements of optical power and optical spectrum shape are disposed at the transmitter and/or receiver nodes to ensure acceptable wavelength performance. The present invention is applicable to networks equipped with performance monitoring capabilities. More specifically, the methods of the invention are applicable to WDM transmission systems, which are in general provided with means for measuring total optical power and per channel power and/or OSNR at various network elements of interest.

Figure 3A:
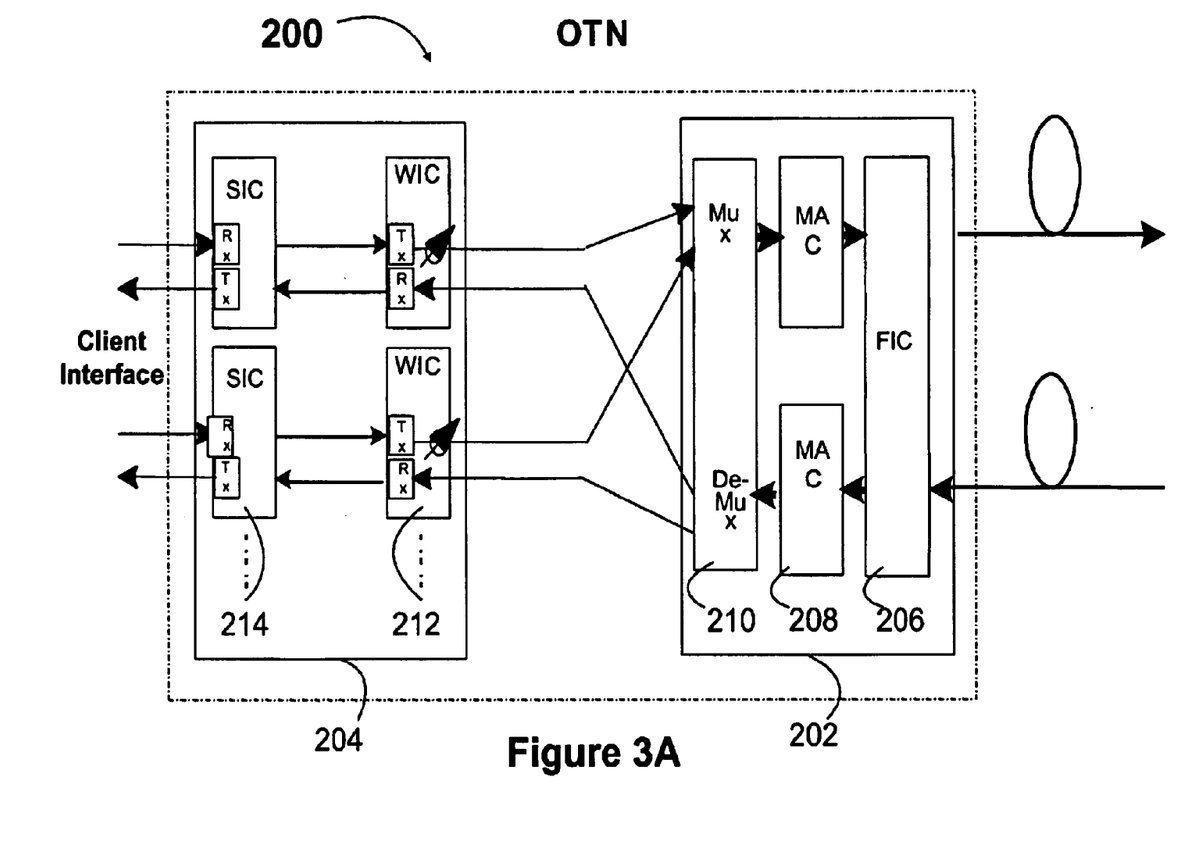
FIG. 3A is a schematic illustration showing an exemplary configuration for an optical termination node (OTN) node, according to one embodiment of the present invention.

For illustration purposes, FIG. 3A shows an exemplary configuration for an optical termination node (OTN) node 200 with signals flowing in two opposite directions. The illustrated OTN 200 includes an optical processing unit 202, which provides all the optical functionality, such as optical amplification and wavelength multiplexing. The OTN 200 additionally includes an electrical processing unit 204, which provides all the electrical functionality, such as electrical termination and SONET processing. The optical processing unit 202 is composed of a fiber interface card (FIC) 206, modular amplifier cards (MAC) 208, and multiplexer (MUX) and demultiplexer (DEMUX) 210. The electrical processing unit 204 is composed of a plurality of wavelength interface cards (WIC) 212 with each corresponding to a wavelength and a plurality of service interface cards (SIC) 214.

Figure 3B:
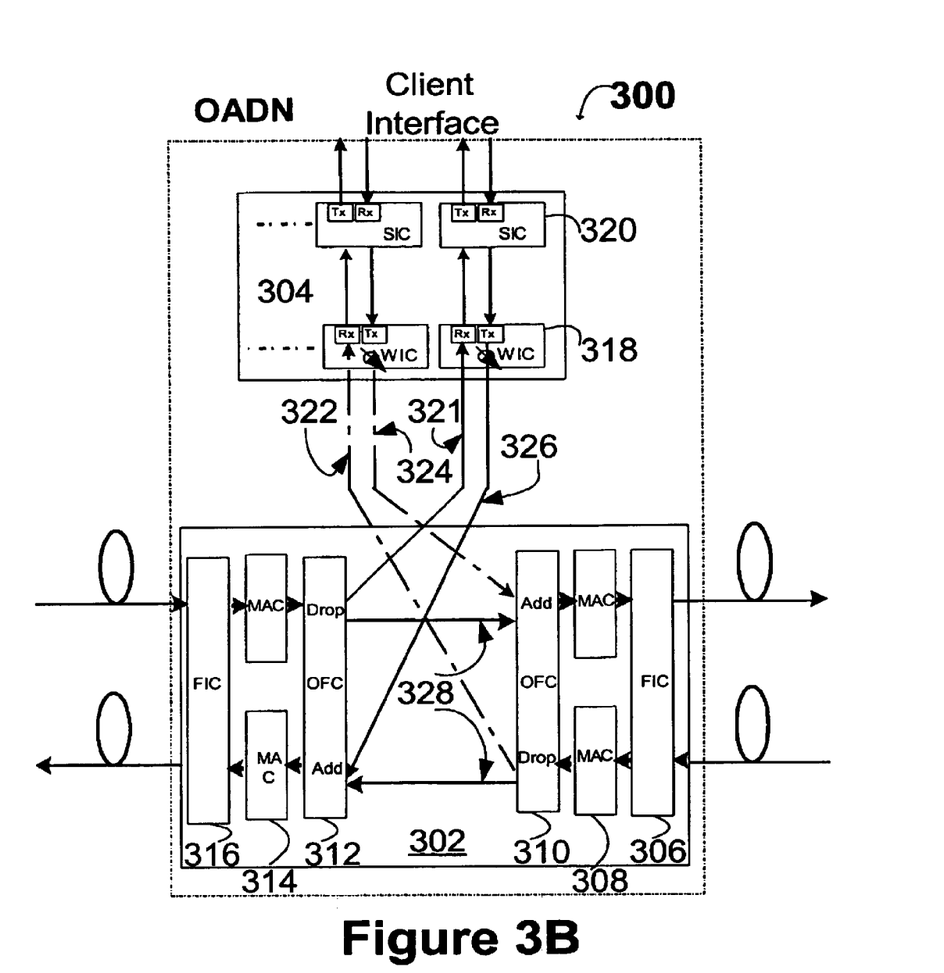
FIG. 3B is a schematic illustration showing an exemplary configuration for optical add/drop node (OADN) node, according to one embodiment of the present invention.

FIG. 3B shows an exemplary configuration for optical add/drop node (OADN) node 300, also with signals flowing in two opposing directions. The illustrated OADN 300 includes an optical processing unit 302 and an electrical processing unit 304. Similar to OTN 200 in FIG. 3A, the optical processing unit 302 further includes a first fiber interface card (FIC) 306 and a second FIC 316, a first modular amplifier card (MAC) 308 and a second modular amplifier card 314, and a first optical fiber coupler (OFC) 310 and second optical fiber coupler 312 for add/drop wavelengths. Depending on the configuration of OFCs, a first wavelength 321 and a second wavelength 322 can be dropped from OADN 300, and a third wavelength 324 and fourth wavelength 326 can be added back via OADN 300. Express wavelength 328 passes through OADN 300. The electrical processing unit 304 includes a plurality of wavelength interface cards (WIC) 318 and a plurality of service interface cards (SIC) 320. The components that constitute the optical nodes, such as OTN and OADN, are well known to one of ordinary skill in the art.

In optical communication systems, optical power is one of the essential parameters to determine the system performance. There are two types of optical power monitored in the system: total power and per channel power. The total power is detected by the photo-detector built into the MAC and FIC. It is used to control EDFAs. The per channel power is measured by channel monitoring card (CMC) and used to balance and optimize the channel performance. Also, to optimize system performance, such as to achieve flat gains or equal OSNRs at the receiver node, the transmitter powers are adjusted. The adjustments are determined by an optical model based on the OSNR or Q measurements and the topology information of the optical link. These channel power adjustments are used to tune the transmitters.

Figure 4:
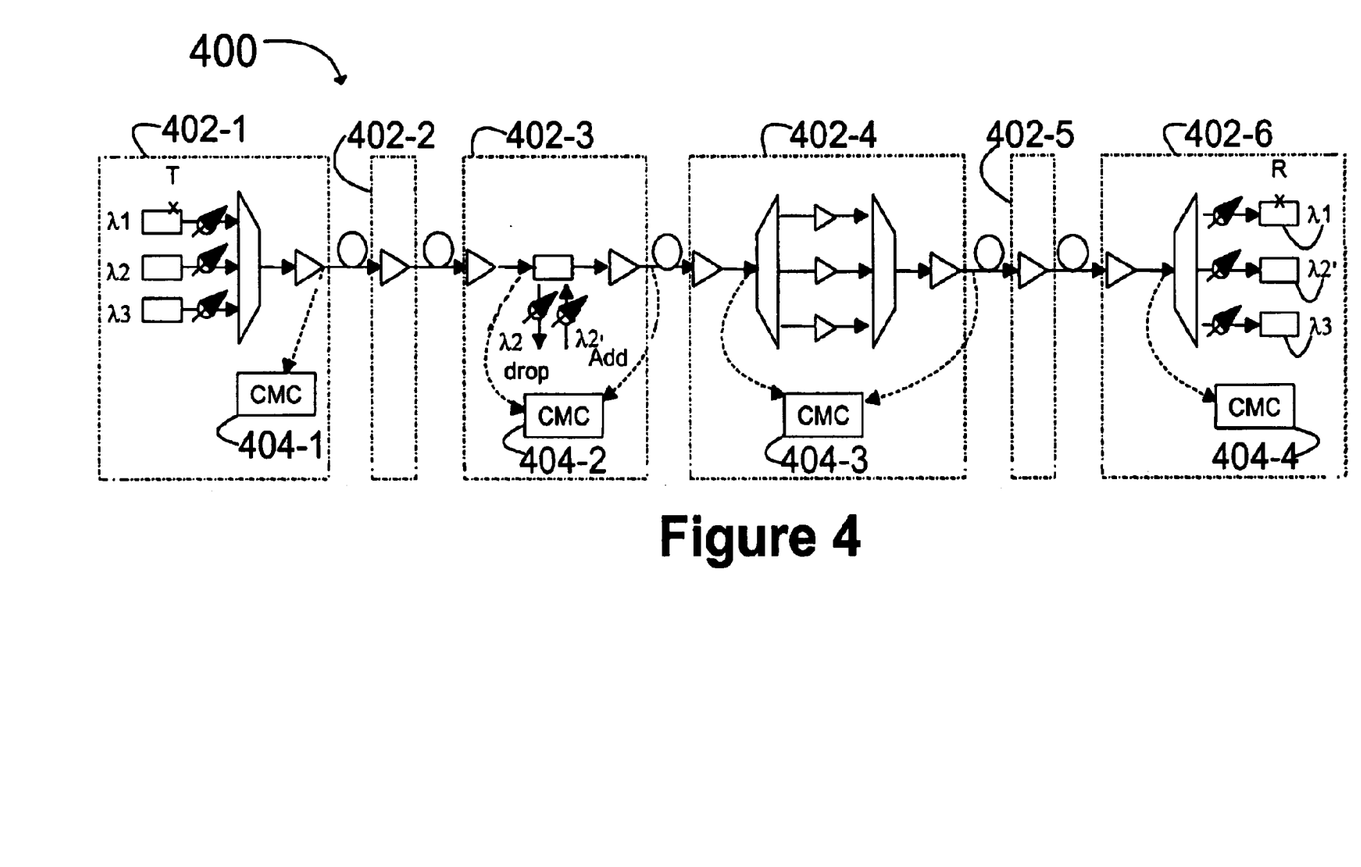
FIG. 4 is a schematic illustration showing an exemplary channel balance section in accordance with the teachings of the present invention.

FIG. 4 shows an exemplary channel balance section 400 in accordance with the present invention, which includes first node 402-1, second node 402-2, third node 402-3, fourth node 402-4, fifth node 402-5, and sixth node 402-6 that can form a part of an optical network. The first node 402-1 is the starting node and the sixth node 402-6 is the ending node. A first channel λ1, a second channel λ2, and a third channel λ3 are added at the first node 402-1. The first and third channels λ1 and λ3 are express channels from the first node 402-1 to the sixth node 402-6. The second channel λ2 is dropped at the third node 402-3 and a fourth channel λ2' is added at the third node 402-3. The per-channel power and performance such as OSNR can be monitored using a first CMC 404-1, a second CMC 404-2, a third CMC 404-3, and a fourth CMC 404-4.

From each node perspective, at the first node 402-1, each of the channels λ1, λ2, and λ3 can be identified as add type channels. At the second node 402-2, which amplifies the channels, each channel λ1, λ2, and λ3 is identified as a bypass channel. Since the second channel λ2 is dropped at the third node 402-3, this channel is identified as a drop channel while the first and third channels λ1 and λ3 are identified as bypass channels. The fourth channel λ2' is identified as an add channel at the third node 402-3. At the fourth node 402-4 and the fifth node 402-5, each of the first, third, and fourth channels λ1, λ3, and λ2' are bypass channels. At the sixth node 402-6, the first, third, and fourth channels λ1, λ3, and λ2' are identified as drop channels.

From the balance section perspective, the first and third channels λ1 and λ3 are express channels from the first node 402-1 to the sixth node 402-6. The second and fourth channels λ2 and λ2' are add/drop channels, as the second channel λ2 is dropped at the third node 402-3 and the fourth channel λ2' is added at the third node 402-3. It is understood that the second and fourth channels λ2 and λ2' can have the same wavelength. The wave path information can be maintained using a look-up table, list, or some other form of reference or calculation. An exemplary Wave Path Table (WPT) is illustrated in Table 1 for channel balance section in FIG. 4.

TABLE 1

Wave Path Table (WPT) for channel balance section in FIG. 4

| No. of Ch | Wavelength | Mailing address | Node A | Node B | Node C | Node D | Node E | Node F | Channel Type In Link |
|---|---|---|---|---|---|---|---|---|---|
| 1 | λ1 | A to F | Add | By-pass | By-pass | By-pass | By-pass | Drop | Express |
| 2 | λ2 | A to C | Add | By-pass | Drop | — | — | — | Add/drop |
| 3 | λ3 | A to F | Add | By-pass | By-pass | By-pass | By-pass | Drop | Express |
| 4 | λ2' | C to F | — | — | Ingress | By-pass | By-pass | Drop | Add/drop |

Once the channels are identified as express or add/drop, power equalization can be achieved over the channel balance section on a channel by channel basis, as described in detail below. The channel balance process starts from starting node at the first node 402-1 by first working on express channels λ1 and λ3. The first node 402-1 sends a message to the ending node at the sixth node 402-6 to request channel powers and channel performance values, such as OSNRs for each express channel λ1 and λ3. The inter-node communication can be done in a variety of ways such as with either a centralized network management module or a distributed software controller module on each node. The difference between the target channel performance and actual channel performance can then be determined. Based on the physical and/or mathematical relationship between channel performance change and TX power change, such as a linear relationship, the desired TX power changes for the first and third express channels λ1 and λ3 that bring performance of the express channels λ1 and λ3 to the target value, can be calculated. Then, the new TX power values are used to set transmitter power for the first and third express channels λ1 and λ3. Some special handling rules can also be applied as follows:

a) If the difference between new and old power values for a channel is within a predetermined value such as 1 dB, the channel is considered to be balanced;

b) If the new power value for a channel is out of the dynamic range of the transmitter, which means the channel can not be balanced, then the limit power value (upper or lower) will be used to set the transmitter; and c) Transmitter power will be adjusted incrementally no more than a predetermined step value such as 2 dB each time. If the difference is more than 2 dB, more iterations will be needed. An iteration upper limit such as 5 can be set.

The channel balance process then moves to non-express second channel λ2, which starts from the first node 402-1 and is dropped at the third node 402-3. There are variety of ways of setting TX power for non-express second channel λ2 which largely depends on availability of information for the second channel λ2. If a wave path for the second channel λ2 can be tracked, and its performance such as OSNR can be measured, a similar procedure to that of the express channel can be applied to the second channel λ2. For illustrative purposes, a simple approach without tracking λ2 wave path is used in accordance with the teachings of the present invention. The software controller module in node 402-1 or network management module calculates the new TX power value for the second channel λ2 as the mean of TX power of its two adjacent (for example, based on ITU frequency) express channels λ1 and λ3. The obtained TX power is then used to set transmitter power for the second channel λ2. The same special handling rules applied to express channels can be applied to non-express channels.

The channel balance process moves to channels added at intermediate OADNs. Starting from the third node (OADN) 402-3, which is the nearest to the starting node 402-1, inter-node communication software informs the third node (OADN) 402-3 to balance channels added via the third node 402-3, which is the fourth channel λ2'. There are also a variety of ways of setting TX power for the fourth channel λ2' that largely depend on availability of information for the fourth channel λ2' similar to the second channel λ2. If a wave path for the fourth channel λ2' can be tracked, and its performance such as OSNR can be measured, a similar procedure to that of the express channel can be applied to the fourth channel λ2'. For illustrative purposes, the same method for the second channel λ2 is applied to the fourth channel λ2'. Hence, the new TX power value for the fourth channel λ2' can be determined as the mean of TX power of its two adjacent (for example, based on ITU frequency) express channels λ1 and λ3. The obtained TX power is then used to set transmitter power for the fourth channel λ2' at the third node (OADN) 402-3. The same special handling rules applied to express channels can be applied to the (non-express) fourth channel λ2'.

Figure 5:
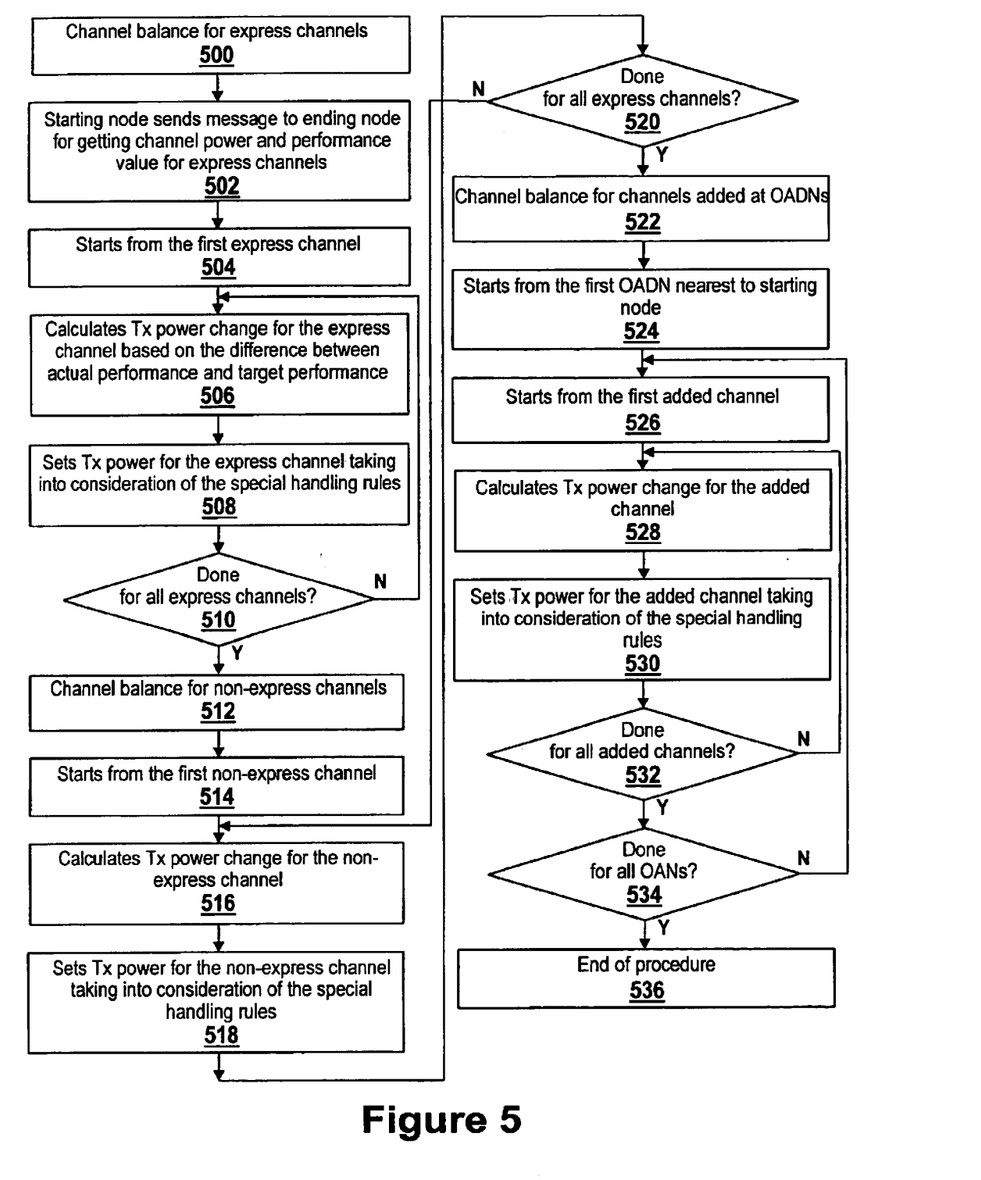
FIG. 5 is a flowchart depicting the channel balance procedure in accordance with the teachings of the present invention.

FIG. 5 shows a flow diagram summarizing the channel balance procedure in accordance with the present invention. The procedure begins at express channels 500. Through use of an inter-node communication mechanism either in the form of a centralized network management system or a distributed system, a starting node sends a message to an ending node to get the channel power and channel performance, such as OSNRs, for all express channels 502. For each express channel 504, TX power change, which brings channel performance to a target value is determined 506, and used to set the TX channel power by taking into consideration the special handling rules 508. The process continues until complete for each of the express channels 510. The procedure then moves to non-express channels 512. For each non-express channel, which starts from the starting node and ends at some OADN 514, TX power change is determined 516, and used to set the TX channel power by taking into consideration the special handling rules 518. The process continues until complete for each of the non-express channels 520. The procedure then moves to channels added at OADNs 522. Starting from the OADN that is nearest (other sequences can be used) to the starting node 524, for each added channel at the OADN 526, TX power change is determined 528, and used to set the TX channel power by taking into consideration the special handling rules 530. The process continues until complete for each of the added channels at this OADN 532, and also loops until complete for all OADNs 534 until finished 536.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

What is claimed is:

1. A method of channel balance for a channel balance section in an optical network with a starting node, an ending node and a plurality of intermediate add/drop nodes which further has a plurality of wavelengths, comprising steps of:
    determining express channels and non-express channels starting from said starting node;
    for each said express channel;
        calculating a transmitter power change in said starting node that brings said express channel to a predetermined channel performance value;
    for each said non-express channel;
        calculating a transmitter power change in said starting node for said non-express channel by setting new transmitter power equal to the mean value of the transmitter powers of two express channels adjacent to said channel;
    for each said add/drop node;
        determining channels added via said add/drop node; and
        calculating a transmitter power change in said add/drop node for said added channel.

2. The method according to claim 1 wherein the step of determining express channels and non-express channels is based on a wave path table.

3. The wave path table in claim 2 records for each channel its transmitter node and receiver node.

4. The method according to claim 1 wherein the step of calculating transmitter power change for each express channels further includes determining the difference between the actual channel performance and said predetermined channel performance.

5. The method according to claim 1 wherein the step of calculating transmitter power change for each express channel further includes a linear relationship between transmitter power change and channel performance change.

6. The method according to claim 1 wherein channel performance is optical signal-to-noise ratio.

7. The method according to claim 1 wherein channel performance is channel power.

8. The method according to claim 1 wherein channel performance is bit error rate.

9. The method according to claim 1 wherein channel performance is Q value.

10. The method according to claim 1 wherein predetermined channel performance value is the average channel performance value of all express channels.

11. The method according to claim 1 wherein predetermined channel performance value is based on a user-defined output power spectral shape.

12. The method according to claim 1 wherein predetermined channel performance value is based on a user-defined output optical signal-to-noise ratio spectral shape.

13. The method according to claim 1 wherein channel balance for each said express channel is implemented as a multiple iteration process.

14. The method according to claim 1 wherein the step of calculating transmitter power change for each added channel in an add/drop node includes setting new transmitter power equal to the mean value of the transmitter powers of two express channels adjacent to said channel.

15. The determination of adjacent express channels in claim 14 is based on ITU wavelength frequency.

16. The determination of adjacent express channels in claim 1 is based on ITU wavelength frequency.

* * * * *